United States Patent [19]

Lieker

[11] Patent Number: 4,623,193

[45] Date of Patent: Nov. 18, 1986

[54] SEAT WITH LUMBAR SUPPORT

[75] Inventor: Reiner Lieker, Extertal, Fed. Rep. of Germany

[73] Assignee: P.A. Rentrop Hubert & Wagner Fahrzeugausstattungen GmbH & Co KG, Stadthagen, Fed. Rep. of Germany

[21] Appl. No.: 584,108

[22] Filed: Feb. 27, 1984

[30] Foreign Application Priority Data

Feb. 28, 1983 [DE] Fed. Rep. of Germany ....... 3306994

[51] Int. Cl.[4] .......................... A47C 7/40; B60N 1/02
[52] U.S. Cl. ................................................. 297/284
[58] Field of Search ................ 297/284, 353, 410, 452

[56] References Cited

U.S. PATENT DOCUMENTS

| 3,258,259 | 6/1966 | Bohlin | 297/284 X |
| 3,887,232 | 6/1975 | Dinkel | 297/367 |
| 4,154,477 | 5/1979 | Swenson et al. | 297/410 X |
| 4,296,965 | 10/1981 | Sakurada et al. | 297/284 |
| 4,449,751 | 5/1984 | Murphy et al. | 297/284 |
| 4,469,374 | 9/1984 | Kashihara et al. | 297/284 |

FOREIGN PATENT DOCUMENTS

| 285617 | 2/1965 | Netherlands | 297/353 |
| 640877 | 1/1979 | U.S.S.R. | 297/284 |

Primary Examiner—Francis K. Zugel
Assistant Examiner—Peter R. Brown
Attorney, Agent, or Firm—Penrose Lucas Albright

[57] ABSTRACT

A seat has a lumbar support which comprises a flexible pressure strap carried by a U-shaped harness extending across the back rest. The support is infinitely variably pivotable realtive to the back rest frame.

13 Claims, 2 Drawing Figures

FIG. I.

SEAT WITH LUMBAR SUPPORT

BACKGROUND OF THE INVENTION

Technical Field

The present invention relates to seats with lumbar or lordotic supports provided to press against the undersprings of the back rest of the seat. Such seats are particularly, but no exclusively, suitable for use as vehicle seats.

SUMMARY OF THE INVENTION

The object of the invention is to improve a seat of this type in such a manner that the lumbar or lordotic support is effective over the entire width of the back rest and that it is adjustable to the individual needs of the user.

The present invention provides a seat including a seat portion area, a back rest connected to the seat portion and having underspringing, a lumbar support adapted to be pressed against the underspringing of said back rest, said lumbar support including a pressure strap extending across the width of the back rest, and a carrying frame for said strap, which frame is infinitely variably pivotably mounted to the back rest.

DESCRIPTION OF A PREFERRED EMBODIMENT

Figure 1:
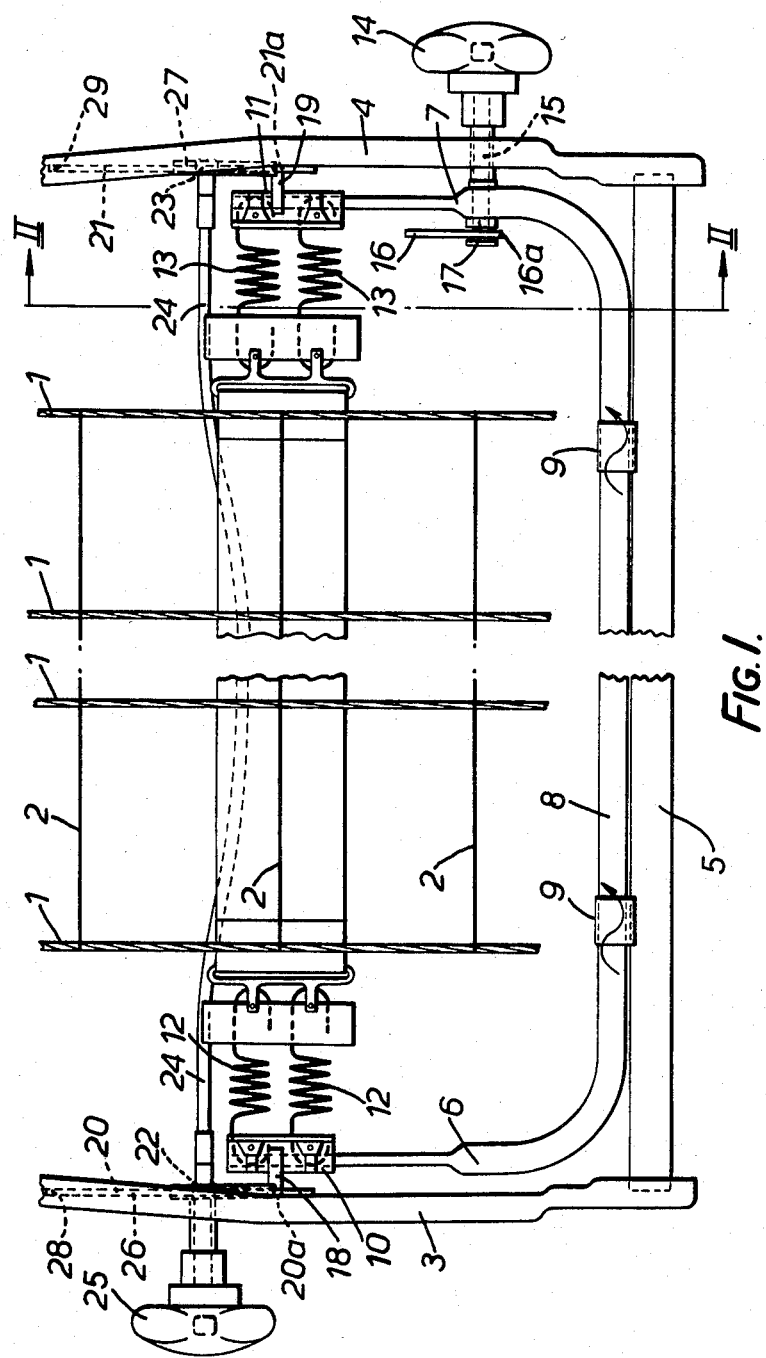
FIG. 1 is a partial view of the back rest of a motor vehicle seat with the padding omitted for clarity.

FIG. 1 of the drawings shows the underspringing of a seat back rest. The underspringing consists of wires 1 disposed at a distance from one another, and crosswires 2 disposed at a distance from one another. The wires 1 and 2 are encased in paper. The network formed by the wires 1,2 is anchored to a frame of the back rest with the interposition of elastic elements, e.g. spiral springs or the like. As such underspringing is known per se, further details may be dispensed with. References 3,4 denote the two side spars of the back rest frame which are joined together in the lower portion by means of a cross-bar 5.

Reference 6 denotes a lumbar support which can be pressed in infinitely variable manner against the underspringing 1,2. This support is in the form of a pressure strap which extends between the two side spars 3,4 of the back rest frame. The lumbar support 6 is connected with a carrying frame which is infinitely variably pivotably mounted to the back rest frame. This latter support is constructed as a U-shaped harness with two upstanding legs 6,7 and a cross-bar 8.

Bearings 9 provide an articulated connection of the U-shaped harness with the back rest frame. the bearings 9 support the harness cross-bar 8 and are firmly connected with the back rest frame cross-bar 5.

Along each leg 6,7 of the U-shaped harness holders 10,11 for the lumbar support 6 are slidably mounted. In this arrangement each holder 10,11 is connected with an end of the lumbar support by means of elastic elements, e.g. tension springs 12,13.

Infinitely variable pivoting of the support is effected by means of an eccentric drive. In this arrangement a shaft 15 is mounted in the side spar 4 of the back rest. The shaft 15 can be operated by means of a handle 14. At the free end of shaft 15 an eccentric 16, of an eccentric drive is fixed. The working surface 16a of the eccentric 16 engages against an abutment 17 firmly connected with one leg 7 of the support (FIG. 2).

On each holder 10,11 a pin 18,19 is provided. The pin engages in a slot 20a or 21a of a slide member 20 or 21. These two slide members 20,21 are mounted so as to be raised and lowered along the associated side spars 3 and 4 of the back rest, by means of an adjustable drive. As shown in FIG. 2, the slide member 21 is in this arrangement disposed in a respective guide rail 4a which is mounted on the side spar 4. The member 20 is similarly mounted on the other spar 3. Rack and pinion gears are provided as adjustable drives. The pinions 22 and 23 of each rack and pinion are rotatable about a common shaft 24 rotatably mounted in both side spars 3,4 of the back rest. The shaft 24 is rotatable by means of a grip 25.

In this construction each pinion 20 or 23 engages a toothed rack 26,27 which is provided in a longitudinal slit 28,29 of each slide member 20 or 21.

Figure 2:
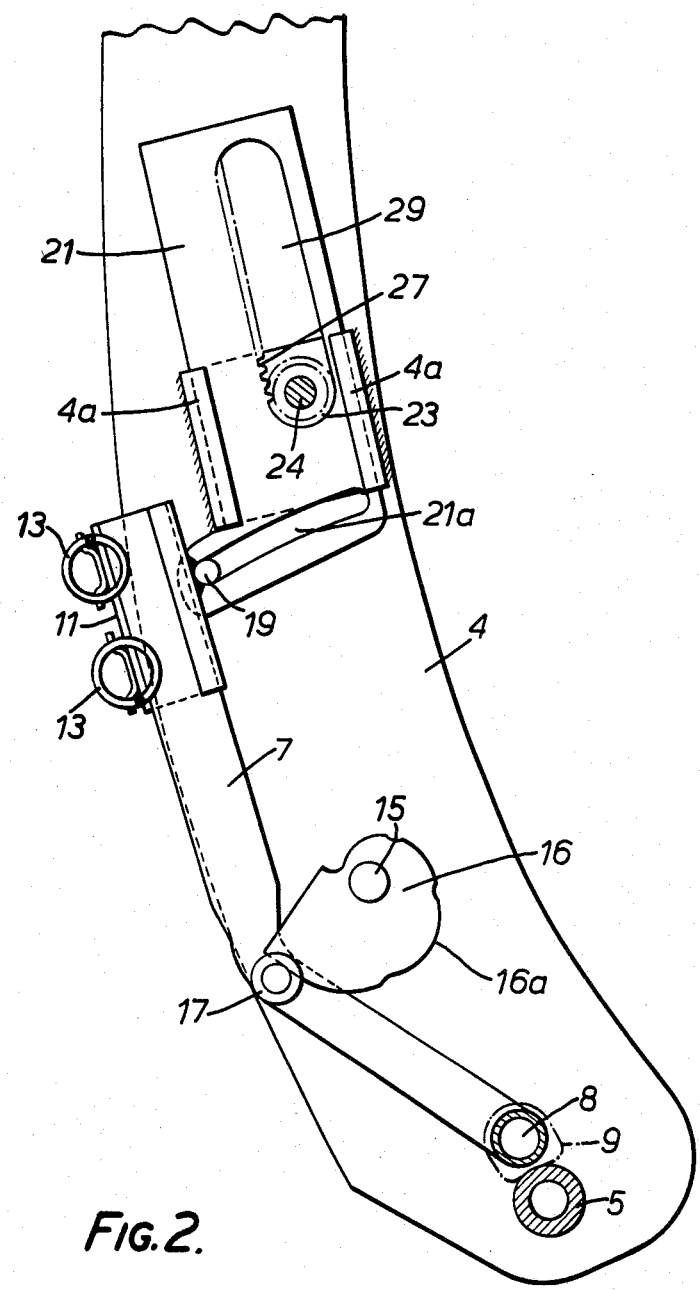
FIG. 2 is a section on an enlarged scale along line II—II in FIG. 1.

If the lumbar support 6 is to be moved from one end position into the other end position represented in FIG. 2 of the drawing, the eccentric 16 is actuated by means of the handle 14, and thus rotated. During this rotary movement the working surface 16a of the eccentric 16, as a result of its engagement with the abutment 17, effects a pivoting of the U-shaped harness and thereby of the lumbar support 6, so that in this area the underspringing 1,2 bulges out forwardly. The underspringing 1,2 moreover ensures the continued engagement of the operative surface 16a of the eccentric 16 with the abutment 17.

Should it be desired to move the lumbar support 6 in the back rest upwards or downwards, the grip 25 must be correspondingly rotated. This rotary motion is, through the rack and pinion gear, converted into a corresponding sliding movement of the two slide members 20 and 21 which take along with them the two holders 10,11 of the lumbar support 6 by means of the two pins 18,19.

Two springs loops are rigidly suspended on each side of the strap so that the springs and strap under load cannot rotate away from the underspringing. Therefore on pivoting of the lumbar support only the degree of curvature of the back rest is modified. By maintaining the spring constant the springing comfort of the back rest is not affected.

It will be appreciated that the described seat provides a constructionally simple lumber support which is reliable and sensitive in operation and which evenly distributes the pressure on the back rest underspringing.

I claim:

1. A seat including
   a seat portion,
   a back rest connected to the seat portion and having a back rest frame and underspringing,
   a lumbar support including a pressure strap in operative pressure engagement with said underspringing, and strap extending across the width of the back rest, a carrying frame, a slide member carried by said back rest frame, holding means connected to said carrying frame so as to be upwardly and downwardly slidable relative to said carrying frame, said strap attached to said holding means, pivotal means mounting said carrying frame to the back rest, first drive means mounted on said backrest and operatively connected with said carrying frame for adjusting the pivotal position of said carrying frame relative to the back rest, guide means in said back rest frame receiving said slide member, and second drive means mounted on said backrest for raising and lowering said slide member in said guide means relative to said back rest, interengaging means connecting said slide member to said holding means in an arrangement such that said latter means is pivotally movable fore and aft relative to said back rest frame whereby said lumbar support is movable both upwardly and downwardly and fore and aft relative to said back rest.

2. A seat according to claim 1, in which said first drive means includes an eccentric drive for adjusting the relative positions of said carrying frame and said back rest.

3. A seat according to claim 2, in which said eccentric drive includes an eccentric, a shaft rotatably mounted to the back rest, said shaft carrying said eccentric, and a handgrip for rotating said shaft and eccentric.

4. A seat according to claim 3, in which said eccentric has an operative surface which engages against an abutment on said carrying frame.

5. A seat according to claim 1, in which said carrying frame includes a U-shaped harness having two upstanding legs, and said holding means for said strap slidably mounted on each said leg of said harness.

6. A seat according to claim 5, in which each said holding means is connected with said strap by means of elastic elements.

7. A seat according to claim 5, in which said interengaging means includes a pin on said holding member and a slot in said slide member in which said pin engages.

8. A seat according to claim 7, wherein said slide member comprises a rack, said second drive means including a pinion engageable therewith, and a rotatable shaft mounted to said back rest, which shaft carries said pinion.

9. A seat according to claim 8, in which said rack is defined within a longitudinal slit defined in said slide member.

10. A seat including a back rest having two side members, a cross-bar interconnecting said side members, a U-shaped frame having a cross-piece and two upstanding legs, said frame being provided with means pivotally mounting the said cross-piece to said cross-bar, one said leg having an abutment thereon, a strap having a holder at each end, each said holder being slidably mounted to a respective upstanding leg of said frame, each said holder carrying a laterally outwardly projecting pin, a respective slide member slidably mounted in guide means fixed to the adjacent side member, each said slide member defining an arcuate slot in which said pin of said holder engages, drive means mounted on said backrest and operatively connected with said slide members to move said slide members relative to said side members to adjust the vertical height of said strap via said pin and slot engagement, a rotatable shaft mounted in one said side member and fixedly carrying an operating handle and an eccentric, said eccentric engageable with said abutment to adjustably pivot said frame relative to said back rest about said pivotal mounting means, whereby said pin and slot engagement between said holders of said strap and said slide members permits both relative pivoting and vertical motions between said strap and said back rest.

11. A seat including a seat portion, a back rest connected to the seat portion and having underspringing, a lumbar support including a pressure strap in operative pressure engagement with said underspringing, said strap extending across the width of said back rest, a respective holder fixed to each end of said strap, a pin extending from each said holder, a U-shaped carrying frame for said strap, said carrying frame having two upstanding legs and a cross-piece, each said holder being slidably mounted to a respective said leg, pivotal means mounting said cross-piece of said frame to said back rest, a handle extending from said back rest connected to an eccentric cam which engages said frame for adjusting the pivotal position of said frame relative to said back rest, two slide members, each said slide member having a slot defined therein, said pin of each said holder engaging said slot in a respective said slide member, whereby engagement between said holder and said slide member is maintained when said frame is pivoted relative to said back rest, two guide means in said back rest each receiving a respective said slide member, and drive means mounted on said backrest for raising and lowering said slide member in said guide means relative to said back rest, whereby selective operation of said drive means causes said slide member to move upwardly or downwardly in said guide means thereby raising or lowering said strap via said pin in engagement with said slot.

12. A seat according to claim 11, in which each said holder is connected with said strap by means of elastic elements.

13. A seat according to claim 11, in which said drive means includes a respective rack defined in a second slot in each said slide member, a respective pinion engageable therewith, and a rotatable shaft mounted to said back rest, which shaft carries both said pinions.

* * * * *